United States Patent
Huang et al.

(10) Patent No.: US 12,219,566 B2
(45) Date of Patent: Feb. 4, 2025

(54) UPLINK CONTROL INFORMATION MULTIPLEXING

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Wei Yang, San Diego, CA (US); Tingfang Ji, San Diego, CA (US); Krishna Kiran Mukkavilli, San Diego, CA (US); Ahmed Elshafie, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 17/647,559

(22) Filed: Jan. 10, 2022

(65) Prior Publication Data
US 2022/0225324 A1 Jul. 14, 2022

Related U.S. Application Data

(60) Provisional application No. 63/137,011, filed on Jan. 13, 2021.

(51) Int. Cl.
*H04W 72/21* (2023.01)

(52) U.S. Cl.
CPC .................................. *H04W 72/21* (2023.01)

(58) Field of Classification Search
None
See application file for complete search history.

(56) References Cited

U.S. PATENT DOCUMENTS

| | | | |
|---|---|---|---|
| 2019/0268920 A1* | 8/2019 | Falahati | H04W 72/0446 |
| 2020/0067680 A1* | 2/2020 | Nayeb Nazar | H04L 1/1692 |
| 2021/0329655 A1* | 10/2021 | Liu | H04L 1/1671 |

* cited by examiner

*Primary Examiner* — Minh Trang T Nguyen
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment (UE) may generate an uplink control information (UCI) message including a first UCI bit multiplexed with a second UCI bit, the first UCI bit having a first sequence applied and the second UCI bit having a second sequence, that is orthogonal to the first sequence, applied. The UE may transmit the UCI message. Numerous other aspects are described.

30 Claims, 8 Drawing Sheets

UPLINK CONTROL INFORMATION MULTIPLEXING

CROSS-REFERENCE TO RELATED APPLICATION

This Patent application claims priority to U.S. Provisional Patent Application No. 63/137,011, filed on Jan. 13, 2021 entitled "UPLINK CONTROL INFORMATION MULTIPLEXING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink control information multiplexing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes generating an uplink control information (UCI) message including a first UCI bit multiplexed with a second UCI bit, the first UCI bit having a first sequence applied and the second UCI bit having a second sequence, that is orthogonal to the first sequence, applied; and transmitting the UCI message.

In some aspects, a method of wireless communication performed by a UE includes generating a UCI message including a first UCI bit multiplexed with a second UCI bit, including: selecting a sequence, from a set of candidate sequences, to apply to the second UCI bit, the selection of the sequence indicating the first UCI bit, and applying the sequence to the second UCI bit; and transmitting the UCI message.

In some aspects, a UE for wireless communication includes a memory and one or more processors coupled to the memory, the one or more processors configured to: generate a UCI message including a first UCI bit multiplexed with a second UCI bit, the first UCI bit having a first sequence applied and the second UCI bit having a second sequence, that is orthogonal to the first sequence, applied; and transmit the UCI message.

In some aspects, a UE for wireless communication includes a memory; and one or more processors coupled to the memory, the one or more processors configured to: generate a UCI message including a first UCI bit multiplexed with a second UCI bit, including: selection of a sequence, from a set of candidate sequences, to apply to the second UCI bit, the selection of the sequence indicating the first UCI bit, and application of the sequence to the second UCI bit; and transmit the UCI message.

In some aspects, a non-transitory computer-readable medium storing a set of instructions for wireless communication includes one or more instructions that, when executed by one or more processors of a UE, cause the UE to: generate a UCI message including a first UCI bit multiplexed with a second UCI bit, the first UCI bit having a first sequence applied and the second UCI bit having a second sequence, that is orthogonal to the first sequence, applied; and transmit the UCI message.

In some aspects, a non-transitory computer-readable medium storing a set of instructions for wireless communication includes one or more instructions that, when executed by one or more processors of a UE, cause the UE to: generate a UCI message including a first UCI bit multiplexed with a second UCI bit, including: selection of a sequence, from a set of candidate sequences, to apply to the second UCI bit, the selection of the sequence indicating the first UCI bit, and application of the sequence to the second UCI bit; and transmit the UCI message.

In some aspects, an apparatus for wireless communication includes means for generating a UCI message including a first UCI bit multiplexed with a second UCI bit, the first UCI bit having a first sequence applied and the second UCI bit having a second sequence, that is orthogonal to the first sequence, applied; and means for transmitting the UCI message.

In some aspects, an apparatus for wireless communication includes means for generating a UCI message including a first UCI bit multiplexed with a second UCI bit, including: means for selecting a sequence, from a set of candidate sequences, to apply to the second UCI bit, the selection of the sequence indicating the first UCI bit, and means for applying the sequence to the second UCI bit; and means for transmitting the UCI message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
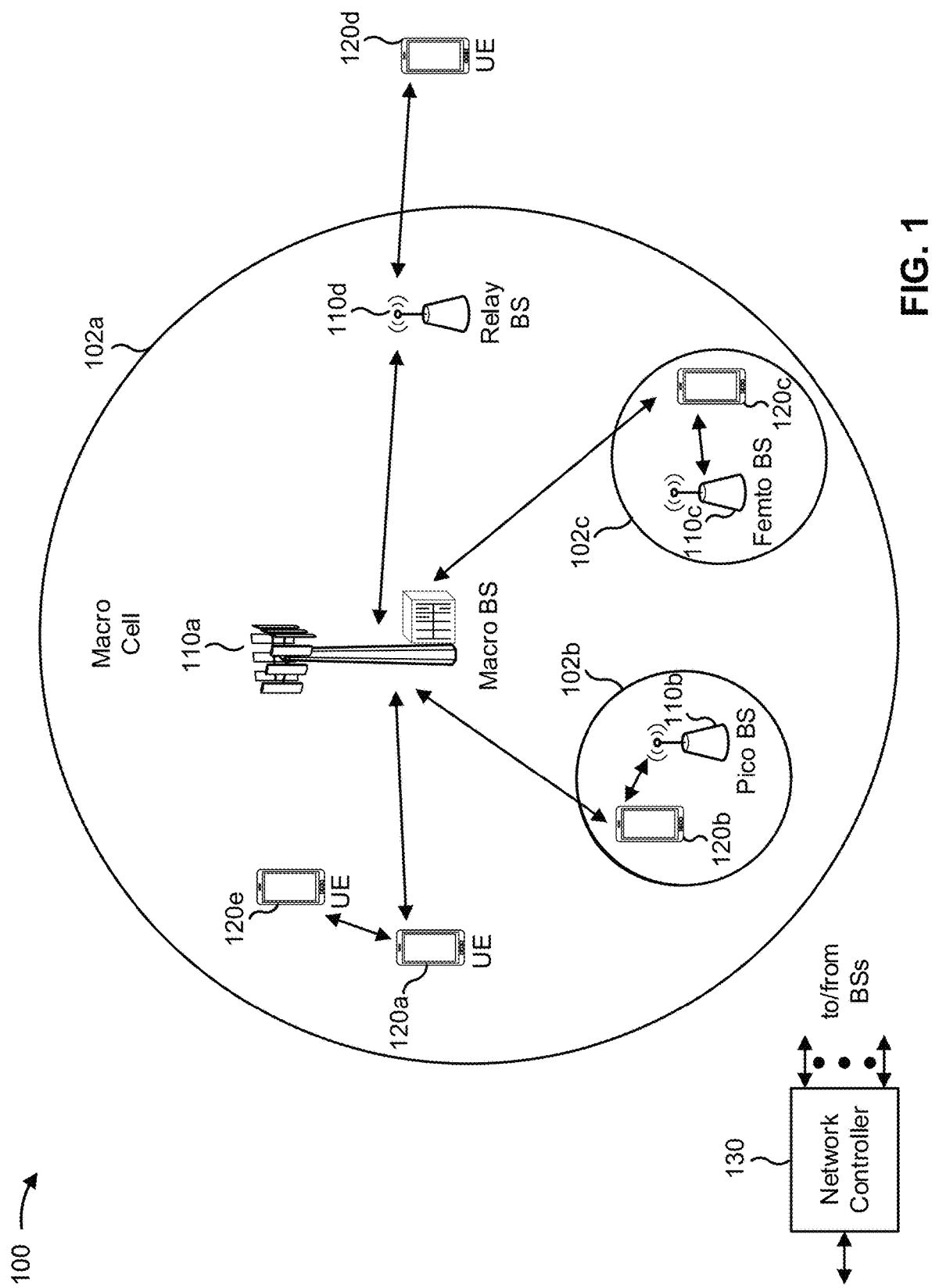
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave"

band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
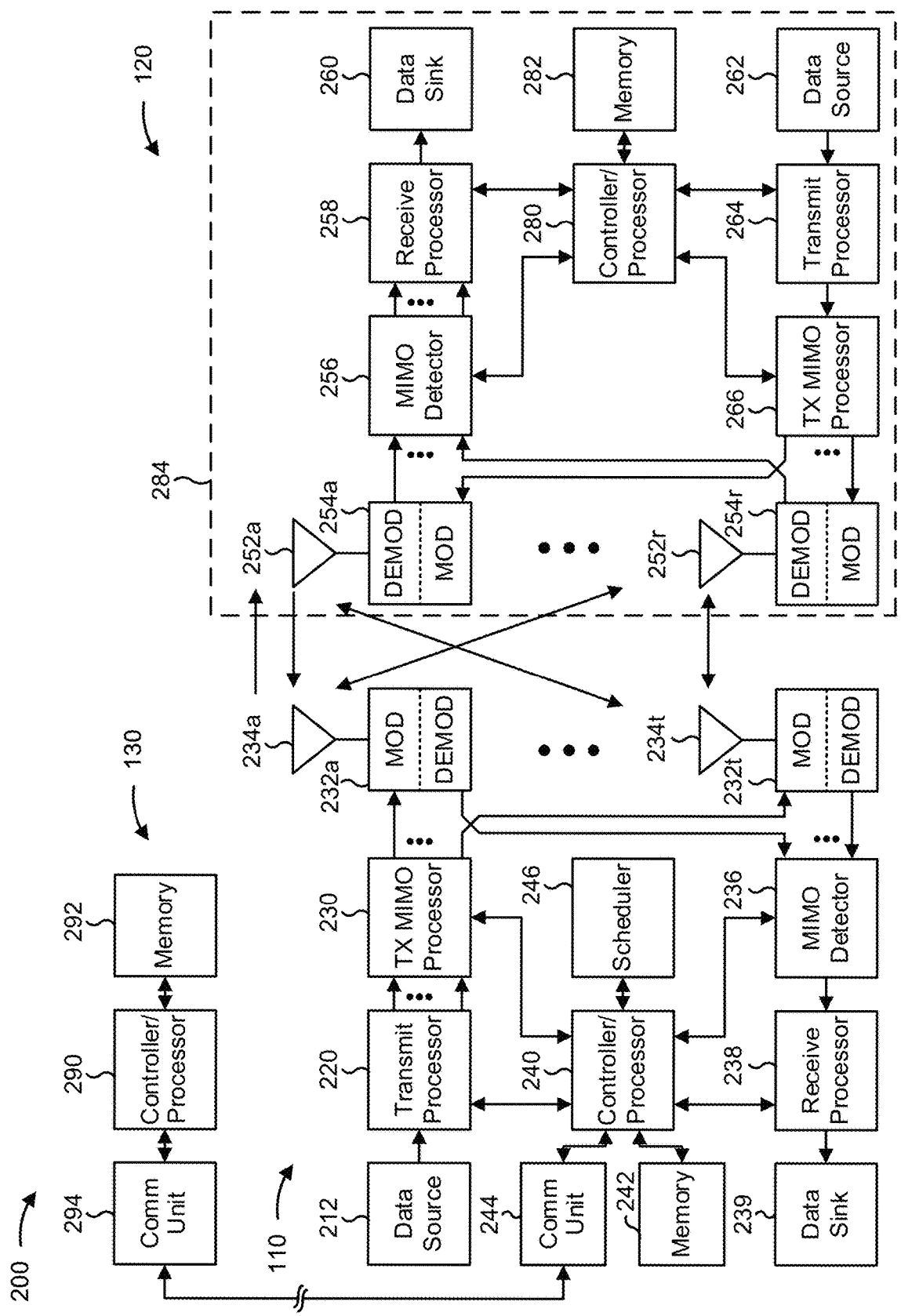
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, as described with reference to FIGS. 4-6.

Controller/processor 240 of base station 110, controller/processor 280 of UE 120, and/or any other component(s) of FIG. 2 may perform one or more techniques associated with uplink control information (UCI) multiplexing, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for generating a UCI message including a first UCI bit multiplexed with a second UCI bit, the first UCI bit having a first sequence applied and the second UCI bit having a second sequence, that is orthogonal to the first sequence, applied; and/or means for transmitting the UCI message. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving, from a base station, an indication of the first sequence and the second sequence.

In some aspects, the UE includes means for receiving, from a base station, an indication of the first cyclic shift index and the second cyclic shift index.

In some aspects, the UE includes means for superimposing the first UCI bit having the first sequence applied with the second UCI bit having the second sequence applied.

In some aspects, the UE includes means for applying a first weight to the first UCI bit having the first sequence applied and applying a second weight to the second UCI bit having the second sequence applied; and/or means for superimposing the first UCI bit having the first sequence applied, and with the first weight applied, with the second UCI bit having the second sequence applied and with the second weight applied.

In some aspects, the UE includes means for receiving, from a base station, an indication to apply the first weight to the first UCI bit and to apply the second weight to the second UCI bit.

In some aspects, the UE includes means for generating a UCI message including a first UCI bit multiplexed with a second UCI bit, including: means for selecting a sequence, from a set of candidate sequences, to apply to the second UCI bit, the selection of the sequence indicating the first UCI bit, means for applying the sequence to the second UCI bit; and/or means for transmitting the UCI message. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an indication of the set of candidate sequences from which the sequence is to be selected to indicate the first UCI bit.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
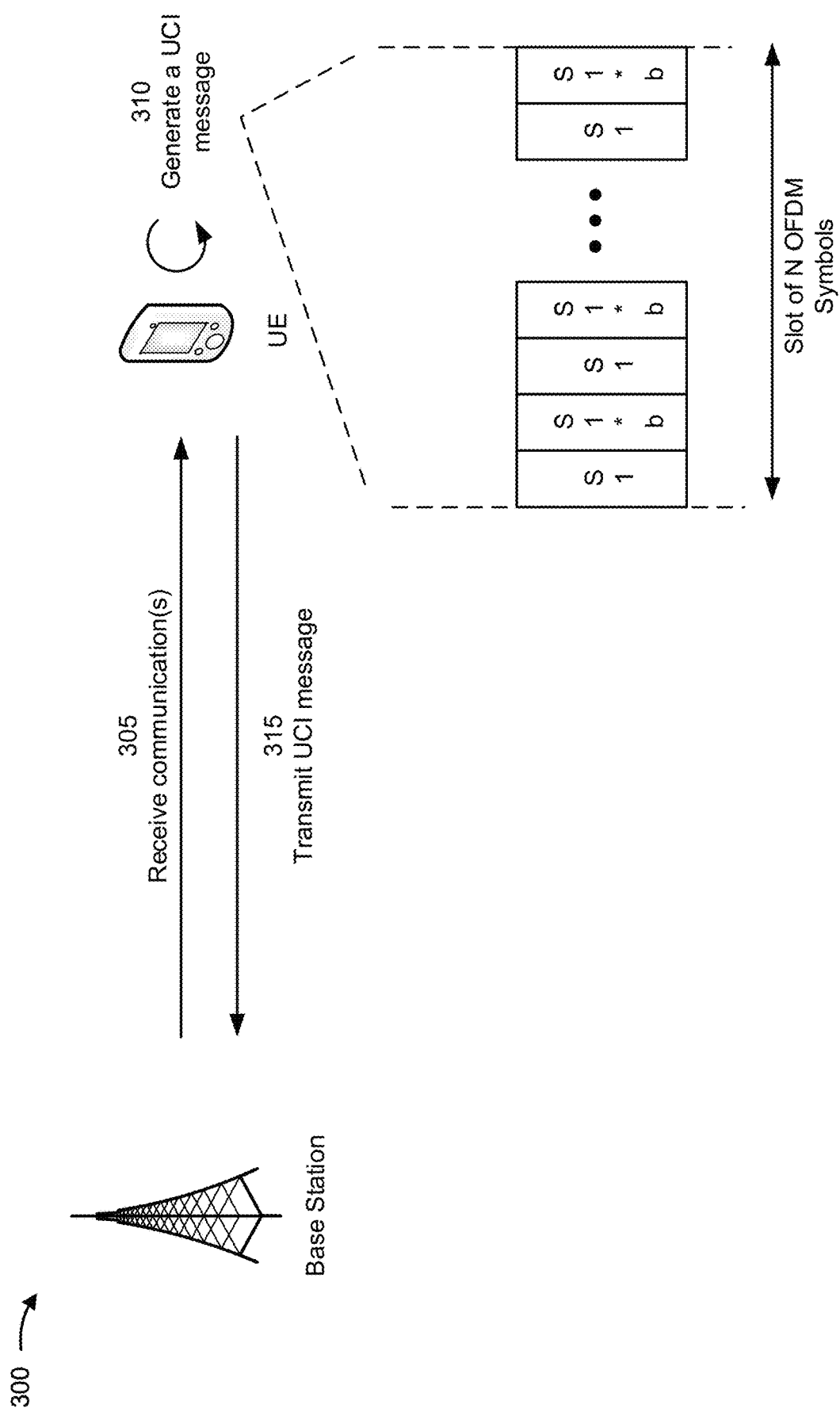
FIG. 3 is a diagram illustrating an example of transmission of an uplink control message, in accordance with the present disclosure.

FIG. 3 is a diagram illustrating an example 300 of transmission of an uplink control message, in accordance with the present disclosure. As shown in FIG. 3, a UE may communicate with a base station. In some aspects, the UE and the base station may be part of a wireless network. The UE may be configured to generate and/or transmit UCI to the base station based at least in part on one or more events, such as receiving a communication and/or determining that the UE has data buffered for transmission, among other examples.

As shown by reference number 305, the UE may receive, and the base station may transmit, one or more communications. For example, the UE may receive a communication associated with a control channel (e.g., a physical downlink control channel (PDCCH)) or a data channel (e.g., a physical downlink shared channel (PD SCH)).

As shown by reference number 310, the UE may generate a UCI message. For example, the UE may generate a UCI message to indicate a hybrid automatic repeat request (HARD) acknowledgment (ACK) or negative ACK (HACK) associated with a received communication. The UE may generate the UCI message based at least in part on a UE-specific sequence, determined by the UE based at least in part on applying a UE-specific cyclic shift index to a cell-specific base sequence (e.g., a base sequence). The UE may map the UE-specific sequence to alternating (e.g., even) symbols of the UCI message to be used as DMRSs. The UE may map the UE-specific sequence, modulated by a UCI payload, on remaining (e.g., odd) symbols of the UCI message. The UCI payload may include a 1-bit payload or a 2-bit payload.

The UE may modulate the UE-specific sequence with a 1-bit payload using binary phase shift keying (BPSK) modulation. For a 1-bit payload, the BPSK modulation produces orthogonal UCI messages using noncoherent decoding (e.g., decoding without DMRSs or using DMRSs as part of a codepoint). For example, two codepoints for a UCI message with a 1-bit payload may be the UE-specific sequence multiplied by [1, 1, 1, 1, . . . ] or [1, −1, 1, −1, . . . ].

The UE may modulate the UE-specific sequence with a 2-bit payload using quadrature phase shift keying (QPSK) modulation. For a 2-bit payload, the QPSK modulation produces non-orthogonal UCI messages using noncoherent decoding. For example, four codepoints for a UCI message with a 2-bit payload may be the UE-specific sequence multiplied by:

$$[1, (1+j)/\sqrt{2}, 1, (1+j)/\sqrt{2}, ...];$$
$$[1, (-1+j)/\sqrt{2}, 1, (-1+j)/\sqrt{2}, ...];$$
$$[1, (-1-j)/\sqrt{2}, 1, (-1-j)/\sqrt{2}, ...]; \text{ or}$$
$$[1, (1-j)/\sqrt{2}, 1, (1-j)/\sqrt{2}, ...]$$

As shown by reference number 315, the UE may transmit, and the base station may receive, the UCI message. Based at least in part on using QPSK modulation of a 2-bit payload, the UCI message codepoints are non-orthogonal and the codepoints are cross-correlated. Based at least in part on the codepoints being non-orthogonal, a base station may fail to receive the UCI message and/or may fail to extract a first UCI bit and a second UCI bit from the UCI message. Based at least in part on the base station failing to extract the first UCI bit and the second UCI bit from the UCI message, the base station may incorrectly determine the first UCI bit or the second UCI bit to be a HARQ-ACK, which may cause the base station to fail to retransmit a communication that was not received by the UE. Additionally, or alternatively, the base station may incorrectly determine the first UCI bit or the second UCI bit to be a HARQ-NACK, which may cause the base station to retransmit a communication that was received by the UE and may consume computing, power, communication, and/or network resources to schedule the communication and to retransmit the communication.

As indicated above, FIG. 3 is provided as an example. Other examples may differ from what is described with regard to FIG. 3.

In some aspects described herein, a UE may generate a UCI message including a first UCI bit multiplexed with a second UCI bit. The UE may generate the UCI message based at least in part on applying a first orthogonal sequence to the first UCI bit and applying a second orthogonal sequence to the second UCI bit. In this way, the UCI message may include a single UCI message that includes a combination of a first codepoint associated with the first UCI bit and a second codepoint associated with the second UCI bit. Candidate codepoints of the first bit may be the first sequence multiplied by [1, 1, 1, 1, . . . ] or [1, −1, 1, −1, . . . ]. Candidate codepoints of the second bit may be the second sequence multiplied by [1, 1, 1, 1, . . . ] or [1, −1, 1, −1, . . . ]. Based at least in part on applying different sequences, the candidate codepoints of the first bit may be orthogonal (e.g., as shown in the candidate codepoints described) to the candidate codepoints of the second bit while using the same time and frequency resources for transmission.

The UE may determine the first sequence and the second sequence based at least in part on signaling from a base station (e.g., associated with the UCI message). For example, the base station may indicate a cell-specific base sequence, a first cyclic shift index to apply to the cell-specific base sequence to generate the first sequence, and a second cyclic shift index to apply to the cell-specific base sequence to generate the second sequence.

In some aspects, the UE may superimpose the first UCI bit having the first orthogonal sequence applied with the second UCI bit having the second orthogonal sequence applied. In some aspects, the UE may apply different weights (e.g., associated with priorities of the UCI bits) to the UCI bits having the orthogonal sequences applied. A base station may receive the UCI message based at least in part on correlating the first sequence with the UCI message to extract the first UCI bit and correlating the second sequence with the UCI message to extract the second UCI bit. In some aspects, the different weights may improve a likelihood of a base station extracting the first UCI bit and the second UCI bit from the UCI message.

In some aspects described herein, a UE may generate a UCI message including a first UCI bit multiplexed with a second UCI bit based at least in part on selecting a sequence, from a set of candidate sequences (e.g., the first sequence and the second sequence), to apply to the second UCI bit. Selection of the sequence may indicate the first UCI bit. The UE may apply the sequence to the second UCI bit (e.g., using BPSK), which may provide two orthogonal codepoints to indicate the second UCI bit via a payload of the UCI message.

In some aspects, the base station may configure the UE with two candidate sequences (e.g., based at least in part on signaling two cyclic shift indices to apply to a cell-specific base sequence) with a mapping of the first sequence to a first value of the first UCI bit (e.g., 0) and with a mapping of the second sequence to a second value of the first UCI bit (e.g., 1). In other words, the base station may indicate to the UE that selection of the first sequence, to apply to the second UCI bit, indicates the first value of the first UCI bit and selection of the second sequence, to apply to the second UCI bit, indicates the second value of the first UCI bit.

Based at least in part on the UE applying a first sequence to the first UCI bit and a second sequence to the second UCI bit, or the UE selecting a sequence and applying the sequence to the second UCI bit, the UE may indicate the first UCI bit and the second UCI bit with mutually orthogonal signaling. Based at least in part on the UE using mutually orthogonal signaling, the base station has an increased likelihood of receiving the UCI messages and extracting the first UCI bit and the second UCI bit. In this way, the base station and/or the UE may conserve computing, power, communication, and/or network resources that may have otherwise been used to detect and/or correct a failure to receive a downlink communication and/or to schedule and/or retransmit a communication received by the UE.

Figure 4:
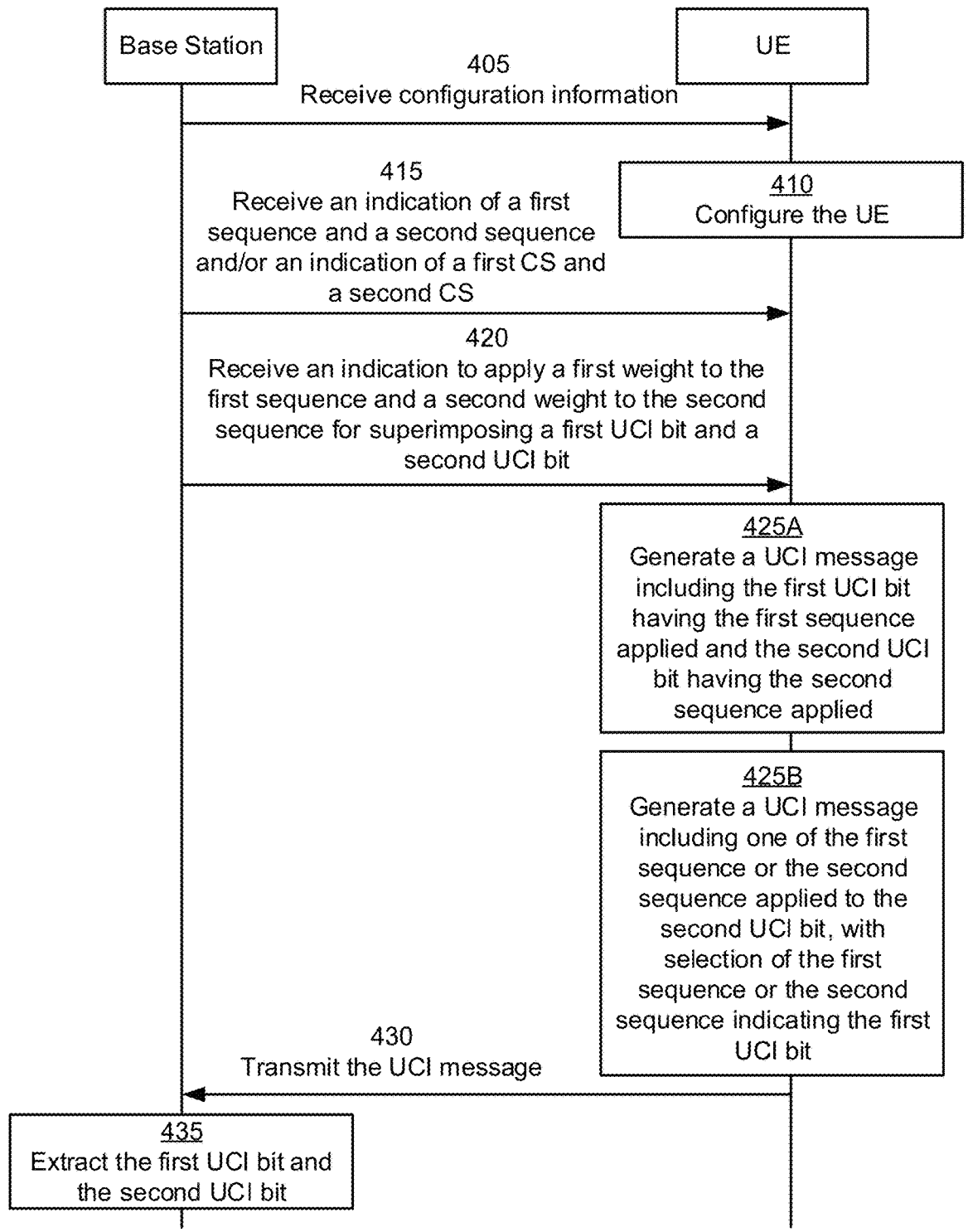
FIG. 4 is a diagram illustrating an example associated with uplink control information multiplexing, in accordance with the present disclosure.

FIG. 4 is a diagram illustrating an example 400 associated with uplink control information multiplexing, in accordance with the present disclosure. As shown in FIG. 4, a UE (e.g., UE 120) may communicate with a base station (e.g., base station 110). In some aspects, the UE and the base station may be part of a wireless network (e.g., wireless network 100).

As shown by reference number 405, the UE may receive configuration information (e.g., from the base station, another base station, and/or the like) and/or may determine the configuration information based at least in part on a communication protocol. In some aspects, the UE may receive the configuration information via one or more of radio resource control (RRC) signaling, medium access control control elements (MAC CEs), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate how the UE is to generate a UCI message having a first bit and a second bit. In some aspects, the configuration information may indicate that the UE is to apply a first sequence to a first UCI bit and a second sequence to a second UCI bit. In some aspects, the configuration information may indicate that the UE is to select a sequence, of a set of candidate sequences, to apply to the second UCI bit, with the selection of the sequence indicating the first UCI bit. In some aspects, the configuration information may indicate the first sequence and the second sequence to use for generating the UCI message.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE may receive, and the base station may transmit, an indication of a first sequence and a second sequence and/or an indication of a first cyclic shift (CS) index and a second cyclic shift index. In some aspects, the UE may receive the indication of the first cyclic shift index and may determine the first sequence based at least in part on applying the first cyclic shift index to a cell-specific base sequence. Similarly, the UE may receive the indication of the second cyclic shift index and may determine the second sequence based at least in part on applying the second cyclic shift index to the cell-specific base sequence. The first sequence and the second sequence may be UE-specific sequences.

In some aspects, the indication of the first sequence and the second sequence and/or an indication of a first cyclic shift index and a second cyclic shift index may include an indication of a set of candidate sequences from which the UE is to choose a sequence to indicate the first UCI bit. In some aspects, the indication of the set of candidate sequences may include an indication of a set of cyclic shift indices to apply to a cell-specific base sequence to generate the set of candidate sequences. In some aspects, the indication of the set of candidate sequences may include an indication that selection of the sequence from the set of candidate sequences indicates the first UCI bit. In some aspects, the indication of the set of sequences may include an indication that selection of the first sequence is associated with a first candidate value of the first UCI bit and selection of the second sequence is associated with a second candidate value of the first UCI bit. In some aspects, the indication of the set of candidate sequences may include an indication that selection of the sequence from the set of candidate sequences indicates the second UCI bit. In some aspects, the indication of the set of sequences may include an indication that selection of the first sequence is associated with a first candidate value of the second UCI bit and selection of the second sequence is associated with a second candidate value of the second UCI bit.

As shown by reference number 420, the UE may receive, and the base station may transmit, an indication to apply a first weight to the first sequence and a second weight to the second sequence for superimposing the first UCI bit and the second UCI bit. In some aspects, the indication may indicate that the first weight is to be applied to the first UCI bit based at least in part on the first weight being greater than the second weight and based at least in part on the first UCI bit having a priority that is greater than a priority of the second UCI bit.

In some aspects, the UE may fail to receive, and/or the base station may fail to transmit, an indication to apply a first weight to the first sequence and a second weight to the second sequence for superimposing the first UCI bit and the second UCI bit. In other words, application of the first weight and the second weight may be optional. In these scenarios, the UE may apply equal weights (e.g., 1) to the first sequence and the second sequence.

In some aspects, the indication to apply the first weight to the first sequence and the second weight to the second sequence for superimposing the first UCI bit and the second UCI bit may be combined (e.g., transmitted and/or received in a single communication) with the indication of the first sequence and the second sequence and/or the indication of the first cyclic shift CS index and the second cyclic shift index.

As shown by reference number 425A, the UE may generate a UCI message including the first UCI bit having the first sequence applied and the second UCI bit having the second sequence applied. In some aspects, the UE may superimpose the first UCI bit having the first sequence applied with the second UCI bit having the second sequence applied. In some aspects, the UE may apply the first weight to the first UCI bit having the first sequence applied and may apply the second weight to the second UCI bit having the second sequence applied before superimposing the first UCI bit with the second UCI bit. In some aspects, the UE may apply the first weight to the first UCI bit having the first sequence applied based at least in part on the first weight being greater than the second weight and based at least in part on the first UCI bit having a higher priority than a priority of the second UCI bit (e.g., the first UCI bit is a high priority bit and the second UCI bit is a low priority bit). The first UCI bit may have a higher priority than a priority of the second UCI bit based at least in part on, for example, a type of UCI bit and/or a downlink communication associated with the first UCI bit (e.g., a control channel communication or a high priority data channel communication, among other examples). In some aspects, the UE may apply the first sequence and/or the first weight to indicate the first UCI bit based at least in part on the first UCI bit having a higher priority than a priority of the second UCI bit.

As shown by reference number 425B, the UE may generate the UCI message including one of the first sequence or the second sequence applied to the second UCI bit, with selection of the first sequence or the second sequence indicating the first UCI bit. In some aspects, the UE may select the first sequence to apply to the second UCI bit to indicate a first candidate value of the first UCI bit, or may select the second sequence to apply to the second UCI bit to indicate a second candidate value of the first UCI bit. In some aspects, the UE may apply the first sequence or the second sequence to the second UCI bit using BPSK modulation of a 1-bit payload to indicate a first value of the second UCI bit or a second value of the second UCI bit. In some aspects, the UE may select the sequence to indicate the first UCI bit based at least in part on the first UCI bit having a higher priority than a priority of the second UCI bit. In some aspects, the UE may select the sequence to indicate the first UCI bit based at least in part on the first UCI bit having a lower priority than a priority of the second UCI bit.

As shown by reference number 430, the UE may transmit, and the base station may receive, the UCI message. In some aspects, the UCI message may be a physical uplink control channel (PUCCH) format 1 message. In some aspects, the UCI message may either include the first sequence applied to the first UCI bit and the second sequence applied to the second UCI bit (e.g., using superposition), or include a selected sequence applied to the second UCI bit with the selected sequence indicating the first UCI bit.

As shown by reference number 435, the base station may extract the first UCI bit and the second UCI bit from the UCI message. In some aspects, the base station may correlate the first sequence with the UCI message to extract the first UCI bit and correlate the second sequence with the UCI message to extract the second UCI bit. In some aspects, the base station may correlate the first sequence with the UCI message and correlate the second sequence with the UCI message to determine whether the UCI message has the first sequence applied or the second sequence applied. The base station may extract the first UCI bit based at least in part on an applied sequence and may extract the second UCI bit based at least in part on a payload extracted from the UCI message.

Based at least in part on the UE applying a first sequence to the first UCI bit and a second sequence to a second UCI bit, or the UE selecting a sequence and applying the sequence to the second UCI bit, the UE may indicate the first UCI bit and the second UCI bit with mutually orthogonal signaling. Based at least in part on the UE using mutually orthogonal signaling, the base station has an increased likelihood of receiving the UCI messages and extracting the first UCI bit and the second UCI bit. In this way, the base station and/or the UE may conserve computing, power, communication, and/or network resources that may have otherwise been used to detect and/or correct a failure to receive a downlink communication and/or to schedule and/or retransmit a communication received by the UE.

As indicated above, FIG. 4 is provided as an example. Other examples may differ from what is described with regard to FIG. 4.

Figure 5:
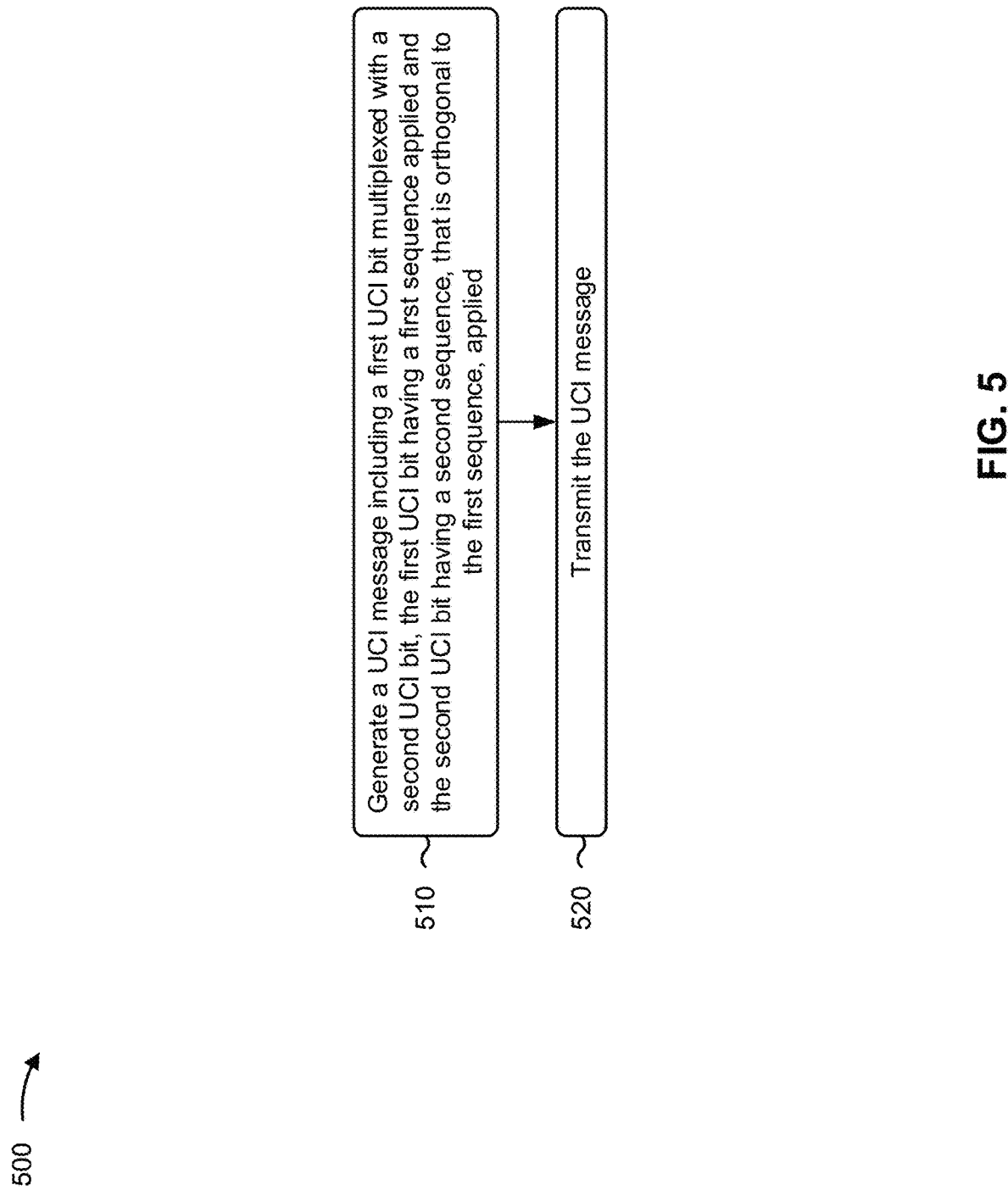
FIGS. 5 and 6 are diagrams illustrating example processes associated with uplink control information multiplexing, in accordance with the present disclosure.

FIG. 5 is a diagram illustrating an example process 500 performed, for example, by a UE, in accordance with the present disclosure. Example process 500 is an example where the UE (e.g., UE 120) performs operations associated with uplink control information multiplexing.

As shown in FIG. 5, in some aspects, process 500 may include generating a UCI message including a first UCI bit multiplexed with a second UCI bit, the first UCI bit having a first sequence applied and the second UCI bit having a second sequence, that is orthogonal to the first sequence, applied (block 510). For example, the UE (e.g., using communication manager 708, depicted in FIG. 7) may generate a UCI message including a first UCI bit multiplexed with a second UCI bit, the first UCI bit having a first sequence applied and the second UCI bit having a second sequence, that is orthogonal to the first sequence, applied, as described above.

As further shown in FIG. 5, in some aspects, process 500 may include transmitting the UCI message (block 520). For example, the UE (e.g., using transmission component 704, depicted in FIG. 7) may transmit the UCI message, as described above.

Process 500 may include additional aspects, such as any single aspect or any combination of aspects described below and/or in connection with one or more other processes described elsewhere herein.

In a first aspect, process 500 includes receiving, from a base station, an indication of the first sequence and the second sequence.

In a second aspect, alone or in combination with the first aspect, the first sequence comprises a cell-specific base sequence having a first cyclic shift index applied (e.g., a first cyclic shift associated with the first cyclic shift index is applied), and the second sequence comprises the cell-specific base sequence having a second cyclic shift index applied (e.g., a second cyclic shift associated with the second cyclic shift index is applied).

In a third aspect, alone or in combination with one or more of the first and second aspects, process 500 includes receiving, from a base station, an indication of the first cyclic shift index and the second cyclic shift index.

In a fourth aspect, alone or in combination with one or more of the first through third aspects, generating the UCI message including the first UCI bit multiplexed with the second UCI bit comprises superimposing the first UCI bit having the first sequence applied with the second UCI bit having the second sequence applied.

In a fifth aspect, alone or in combination with one or more of the first through fourth aspects, the UCI message is configured to be received based at least in part on correlating the first sequence with the UCI message to extract the first UCI bit and correlating the second sequence with the UCI message to extract the second UCI bit.

In a sixth aspect, alone or in combination with one or more of the first through fifth aspects, generating the UCI message including the first UCI bit multiplexed with the second UCI bit comprises applying a first weight to the first UCI bit having the first sequence applied and applying a second weight to the second UCI bit having the second sequence applied, and superimposing the first UCI bit having the first sequence applied, and with the first weight applied, with the second UCI bit having the second sequence applied and with the second weight applied.

In a seventh aspect, alone or in combination with one or more of the first through sixth aspects, the first weight is applied to the first UCI bit having the first sequence applied based at least in part on the first weight being greater than the second weight and based at least in part on the first UCI bit having a higher priority than a priority of the second UCI bit.

In an eighth aspect, alone or in combination with one or more of the first through seventh aspects, process 500 includes receiving, from a base station, an indication to apply the first weight to the first UCI bit and to apply the second weight to the second UCI bit.

In a ninth aspect, alone or in combination with one or more of the first through eighth aspects, the UCI message is a physical uplink control channel format 1 message.

In a tenth aspect, alone or in combination with one or more of the first through ninth aspects, the first UCI bit has a priority that is higher than a priority of the second UCI bit.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
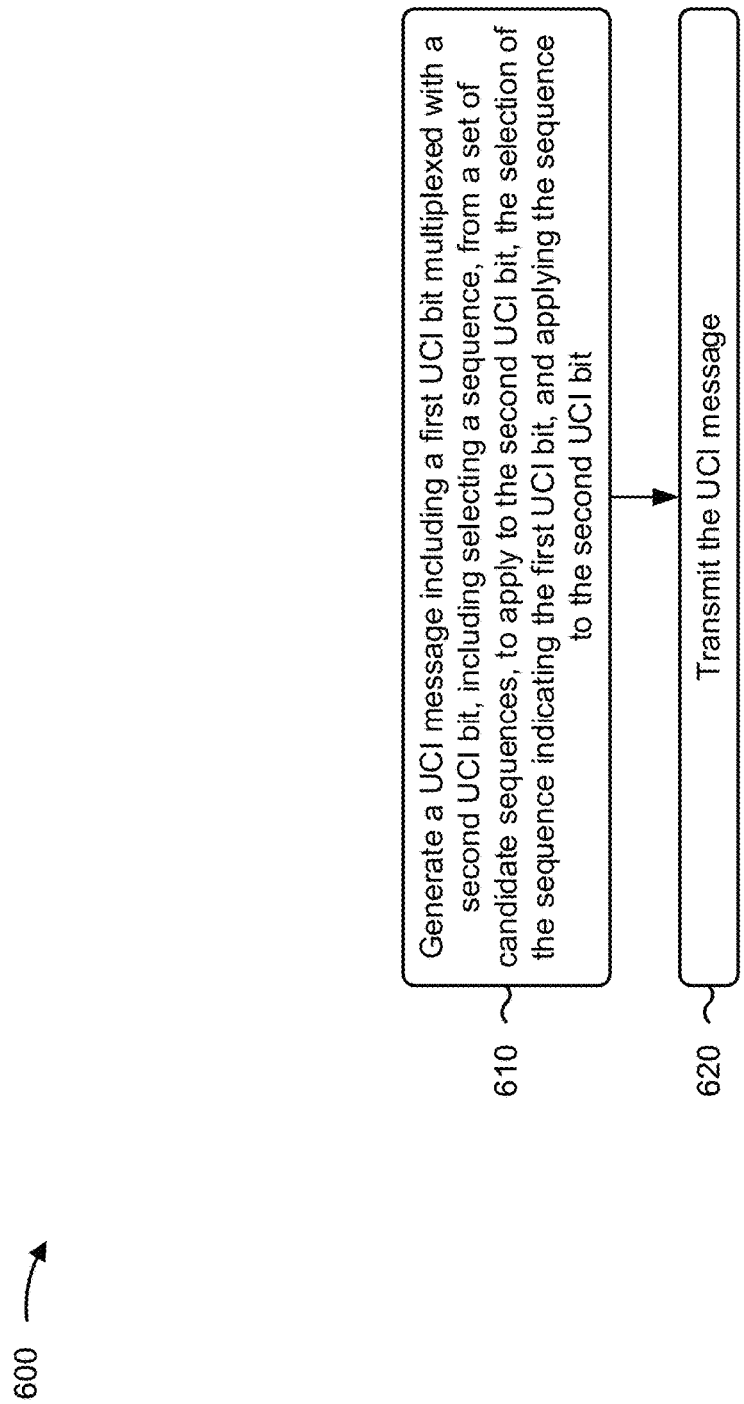

FIG. 6 is a diagram illustrating an example process 600 performed, for example, by a UE, in accordance with the present disclosure. Example process 600 is an example where the UE (e.g., UE 120) performs operations associated with uplink control information multiplexing.

As shown in FIG. 6, in some aspects, process 600 may include generating a UCI message including a first UCI bit multiplexed with a second UCI bit, including: selecting a sequence, from a set of candidate sequences, to apply to the second UCI bit, the selection of the sequence indicating the first UCI bit, and applying the sequence to the second UCI bit (block 610). For example, the UE (e.g., using communication manager 708, depicted in FIG. 7) may generate a UCI message including a first UCI bit multiplexed with a second UCI bit, including: selecting a sequence, from a set of candidate sequences, to apply to the second UCI bit, the selection of the sequence indicating the first UCI bit, and applying the sequence to the second UCI bit, as described above.

As further shown in FIG. 6, in some aspects, process 600 may include transmitting the UCI message (block 620). For example, the UE (e.g., using transmission component 704, depicted in FIG. 7) may transmit the UCI message, as described above.

Process 600 may include additional aspects, such as any single aspect or any combination of aspects described below and/or in connection with one or more other processes described elsewhere herein.

In a first aspect, process 600 includes receiving an indication of the set of candidate sequences from which the sequence is to be selected to indicate the first UCI bit.

In a second aspect, alone or in combination with the first aspect, the indication of the set of candidate sequences includes an indication that selection of the sequence from the set of candidate sequences indicates the first UCI bit.

In a third aspect, alone or in combination with one or more of the first and second aspects, the indication of the set of candidate sequences includes an indication of a set of cyclic shift indices to apply to a cell-specific base sequence to generate the set of candidate sequences.

In a fourth aspect, alone or in combination with one or more of the first through third aspects, the set of candidate sequences includes the sequence and an additional sequence, wherein the sequence is associated with a first candidate value of the first UCI bit, and wherein the additional sequence is associated with a second candidate value of the first UCI bit.

In a fifth aspect, alone or in combination with one or more of the first through fourth aspects, the UCI message is a physical uplink control channel format 1 message.

In a sixth aspect, alone or in combination with one or more of the first through fifth aspects, the first UCI bit has a priority that is higher than a priority of the second UCI bit.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
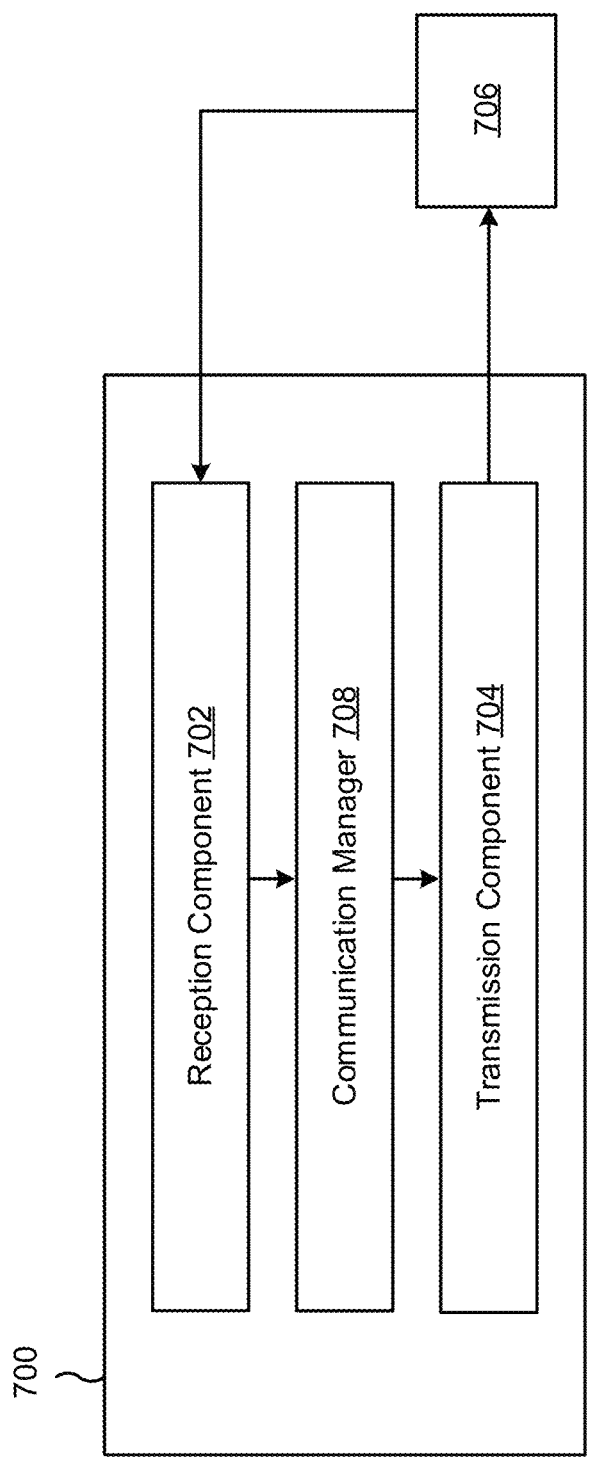
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a communication manager 708.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, process 600 of FIG. 6, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The communication manager 708 may generate a UCI message including a first UCI bit multiplexed with a second UCI bit, the first UCI bit having a first sequence applied and the second UCI bit having a second sequence, that is orthogonal to the first sequence, applied. The transmission component 704 may transmit the UCI message.

The reception component 702 may receive, from a base station, an indication of the first sequence and the second sequence.

The reception component 702 may receive, from a base station, an indication of the first cyclic shift index and the second cyclic shift index.

The reception component 702 may receive, from a base station, an indication to apply the first weight to the first UCI bit and to apply the second weight to the second UCI bit.

The communication manager 708 may generate a UCI message including a first UCI bit multiplexed with a second UCI bit, including selecting a sequence, from a set of candidate sequences, to apply to the second UCI bit, the selection of the sequence indicating the first UCI bit, and applying the sequence to the second UCI bit. The transmission component 704 may transmit the UCI message.

The reception component 702 may receive an indication of the set of candidate sequences from which the sequence is to be selected to indicate the first UCI bit.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
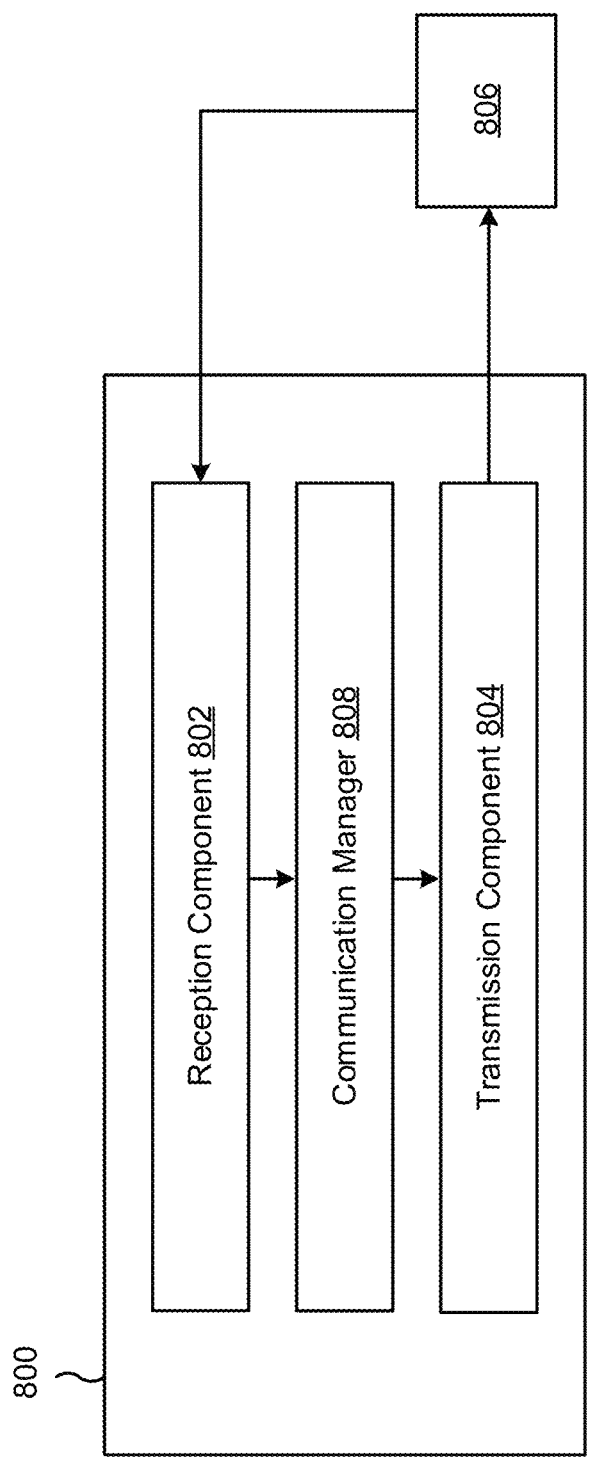

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 4. Additionally, or alternatively, the apparatus 800 may be configured to perform one or more processes described herein. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit configuration information to the UE. The transmission component 804 may transmit an indication of a first sequence and a second sequence and/or an indication of a first cyclic shift index and a second cyclic shift index. The transmission component 804 may transmit an indication to apply a first weight to the first sequence and a second weight to the second sequence for superimposing a first UCI bit and a second UCI bit. The reception component 802 may receive the UCI message. The communication manager 808 may extract the first UCI bit and the second UCI bit from the UCI message.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some aspects of the present disclosure:

Aspect 1: A method of wireless communication performed by a user equipment (UE), comprising: generating an uplink control information (UCI) message including a first UCI bit multiplexed with a second UCI bit, the first UCI bit having a first sequence applied and the second UCI bit having a second sequence, that is orthogonal to the first sequence, applied; and transmitting the UCI message.

Aspect 2: The method of Aspect 1, further comprising: receiving, from a base station, an indication of the first sequence and the second sequence.

Aspect 3: The method of any of Aspects 1 through 2, wherein the first sequence comprises a cell-specific base sequence having a first cyclic shift index applied, and wherein the second sequence comprises the cell-specific base sequence having a second cyclic shift index applied.

Aspect 4: The method of any of Aspects 1 through 3, further comprising: receiving, from a base station, an indication of the first cyclic shift index and the second cyclic shift index.

Aspect 5: The method of any of Aspects 1 through 4, wherein generating the UCI message including the first UCI bit multiplexed with the second UCI bit comprises: superimposing the first UCI bit having the first sequence applied with the second UCI bit having the second sequence applied.

Aspect 6: The method of Aspect 5, wherein the UCI message is configured to be received based at least in part on correlating the first sequence with the UCI message to extract the first UCI bit and correlating the second sequence with the UCI message to extract the second UCI bit.

Aspect 7: The method of any of Aspects 1 through 6, wherein generating the UCI message including the first UCI bit multiplexed with the second UCI bit comprises: applying a first weight to the first UCI bit having the first sequence applied and applying a second weight to the second UCI bit having the second sequence applied; and superimposing the first UCI bit having the first sequence applied, and with the first weight applied, with the second UCI bit having the second sequence applied and with the second weight applied.

Aspect 8: The method of Aspect 7, wherein the first weight is applied to the first UCI bit having the first sequence applied based at least in part on the first weight being greater than the second weight and based at least in part on the first UCI bit having a higher priority than a priority of the second UCI bit.

Aspect 9: The method of Aspect 7, further comprising: receiving, from a base station, an indication to apply the first weight to the first UCI bit and to apply the second weight to the second UCI bit.

Aspect 10: The method of any of Aspects 1 through 9, wherein the UCI message is a physical uplink control channel format 1 message.

Aspect 11: The method of any of aspects 1 through 10, wherein the first UCI bit has a priority that is higher than a priority of the second UCI bit.

Aspect 12: A method of wireless communication performed by a user equipment (UE), comprising: generating an uplink control information (UCI) message including a first UCI bit multiplexed with a second UCI bit, including: selecting a sequence, from a set of candidate sequences, to apply to the second UCI bit, the selection of the sequence indicating the first UCI bit, and applying the sequence to the second UCI bit; and transmitting the UCI message.

Aspect 13: The method of Aspect 12, further comprising: receiving an indication of the set of candidate sequences from which the sequence is to be selected to indicate the first UCI bit.

Aspect 14: The method of Aspect 13, wherein the indication of the set of candidate sequences includes an indication that selection of the sequence from the set of candidate sequences indicates the first UCI bit.

Aspect 15: The method of any of Aspects 13 through 14, wherein the indication of the set of candidate sequences includes an indication of a set of cyclic shift indices to apply to a cell-specific base sequence to generate the set of candidate sequences.

Aspect 16: The method of any of Aspects 12 through 15, wherein the set of candidate sequences includes the sequence and an additional sequence, wherein the sequence is associated with a first candidate value of the first UCI bit, and wherein the additional sequence is associated with a second candidate value of the first UCI bit.

Aspect 17: The method of any of Aspects 12 through 16, wherein the UCI message is a physical uplink control channel format 1 message.

Aspect 18: The method of any of Aspects 12 through 17, wherein the first UCI bit has a priority that is higher than a priority of the second UCI bit.

Aspect 19: An apparatus for wireless communication at a device, comprising a processor; memory coupled with the processor; and instructions stored in the memory and executable by the processor to cause the apparatus to perform the method of one or more aspects of Aspects 1-18.

Aspect 20: A device for wireless communication, comprising a memory and one or more processors coupled to the memory, the memory and the one or more processors configured to perform the method of one or more aspects of Aspects 1-18.

Aspect 21: An apparatus for wireless communication, comprising at least one means for performing the method of one or more aspects of Aspects 1-18.

Aspect 22: A non-transitory computer-readable medium storing code for wireless communication, the code comprising instructions executable by a processor to perform the method of one or more aspects of Aspects 1-18.

Aspect 23: A non-transitory computer-readable medium storing a set of instructions for wireless communication, the set of instructions comprising one or more instructions that, when executed by one or more processors of a device, cause the device to perform the method of one or more aspects of Aspects 1-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more processors configured to:
      generate an uplink control information (UCI) message including a first UCI bit multiplexed with a second UCI bit, the first UCI bit having a first sequence applied and the second UCI bit having a second sequence, that is orthogonal to the first sequence, applied, the first UCI bit having a first priority and the second UCI bit having a second priority that is different than the first priority; and
      transmit the UCI message.

2. The UE of claim 1, wherein the one or more processors are further configured to:
   receive, from a base station, an indication of the first sequence and the second sequence.

3. The UE of claim 1, wherein the first sequence comprises a cell-specific base sequence having a first cyclic shift index applied, and
   wherein the second sequence comprises the cell-specific base sequence having a second cyclic shift index applied.

4. The UE of claim 3, wherein the one or more processors are further configured to:
   receive, from a base station, an indication of the first cyclic shift index and the second cyclic shift index.

5. The UE of claim 1, wherein the one or more processors, when generating the UCI message, are configured to:
   superimpose the first UCI bit having the first sequence applied with the second UCI bit having the second sequence applied.

6. The UE of claim 5, wherein the UCI message is configured to be received based at least in part on correlating the first sequence with the UCI message to extract the first UCI bit and correlating the second sequence with the UCI message to extract the second UCI bit.

7. The UE of claim 1, wherein the one or more processors, when generating the UCI message, are configured to:
   apply a first weight to the first UCI bit having the first sequence applied and applying a second weight to the second UCI bit having the second sequence applied; and
   superimpose the first UCI bit having the first sequence applied, and with the first weight applied, with the second UCI bit having the second sequence applied and with the second weight applied.

8. The UE of claim 7, wherein the first weight is applied to the first UCI bit having the first sequence applied based at least in part on the first weight being greater than the second weight and based at least in part on the first priority of the first UCI bit being a higher priority than the second priority of the second UCI bit.

9. The UE of claim 7, wherein the one or more processors are further configured to:
   receive, from a base station, an indication to apply the first weight to the first UCI bit and to apply the second weight to the second UCI bit.

10. The UE of claim 1, wherein the UCI message is a physical uplink control channel format 1 message.

11. The UE of claim 1, wherein the first priority of the first UCI bit is higher than the second priority of the second UCI bit.

12. A user equipment (UE) for wireless communication, comprising:
    one or more memories; and
    one or more processors coupled to the one or more memories, the one or more processors configured to:
       generate an uplink control information (UCI) message including a first UCI bit multiplexed with a second UCI bit, the first UCI bit having a first priority and the second UCI bit having a second priority that is different than the first priority, generation of the UCI message including:
          selection of a sequence, from a set of candidate sequences, to apply to the second UCI bit, the selection of the sequence indicating the first UCI bit, and application of the sequence to the second UCI bit; and
       transmit the UCI message.

13. The UE of claim 12, wherein the one or more processors are further configured to:
    receive an indication of the set of candidate sequences from which the sequence is to be selected to indicate the first UCI bit.

14. The UE of claim 13, wherein the indication of the set of candidate sequences includes an indication that selection of the sequence from the set of candidate sequences indicates the first UCI bit.

15. The UE of claim 13, wherein the indication of the set of candidate sequences includes an indication of a set of cyclic shift indices to apply to a cell-specific base sequence to generate the set of candidate sequences.

16. The UE of claim 12, wherein the set of candidate sequences includes the sequence and an additional sequence,
    wherein the sequence is associated with a first candidate value of the first UCI bit, and
    wherein the additional sequence is associated with a second candidate value of the first UCI bit.

17. The UE of claim 12, wherein the UCI message is a physical uplink control channel format 1 message.

18. The UE of claim 12, wherein the first priority of the first UCI bit is higher than the second priority of the second UCI bit.

19. A method of wireless communication performed by a user equipment (UE), comprising:
generating an uplink control information (UCI) message including a first UCI bit multiplexed with a second UCI bit, the first UCI bit having a first sequence applied and the second UCI bit having a second sequence, that is orthogonal to the first sequence, applied, the first UCI bit having a first priority and the second UCI bit having a second priority that is different than the first priority; and
transmitting the UCI message.

20. The method of claim 19, further comprising:
receiving, from a base station, an indication of the first sequence and the second sequence.

21. The method of claim 19, wherein the first sequence comprises a cell-specific base sequence having a first cyclic shift index applied, and
wherein the second sequence comprises the cell-specific base sequence having a second cyclic shift index applied.

22. The method of claim 19, wherein generating the UCI message including the first UCI bit multiplexed with the second UCI bit comprises:
superimposing the first UCI bit having the first sequence applied with the second UCI bit having the second sequence applied.

23. The method of claim 19, wherein generating the UCI message including the first UCI bit multiplexed with the second UCI bit comprises:
applying a first weight to the first UCI bit having the first sequence applied and applying a second weight to the second UCI bit having the second sequence applied; and
superimposing the first UCI bit having the first sequence applied, and with the first weight applied, with the second UCI bit having the second sequence applied and with the second weight applied.

24. The method of claim 23, wherein the first weight is applied to the first UCI bit having the first sequence applied based at least in part on the first weight being greater than the second weight and based at least in part on the first priority of the first UCI bit being a higher priority than the second priority of the second UCI bit.

25. The method of claim 23, further comprising:
receiving, from a base station, an indication to apply the first weight to the first UCI bit and to apply the second weight to the second UCI bit.

26. The method of claim 19, wherein the first priority of the first UCI bit is higher than the second priority of the second UCI bit.

27. A method of wireless communication performed by a user equipment (UE), comprising:
generating an uplink control information (UCI) message including a first UCI bit multiplexed with a second UCI bit, the first UCI bit having a first priority and the second UCI bit having a second priority that is different than the first priority, the generating including:
selecting a sequence, from a set of candidate sequences, to apply to the second UCI bit, the selection of the sequence indicating the first UCI bit, and
applying the sequence to the second UCI bit; and
transmitting the UCI message.

28. The method of claim 27, further comprising:
receiving an indication of the set of candidate sequences from which the sequence is to be selected to indicate the first UCI bit.

29. The method of claim 28, wherein the indication of the set of candidate sequences includes an indication that selection of the sequence from the set of candidate sequences indicates the first UCI bit.

30. The method of claim 27, wherein the set of candidate sequences includes the sequence and an additional sequence,
wherein the sequence is associated with a first candidate value of the first UCI bit, and
wherein the additional sequence is associated with a second candidate value of the first UCI bit.

* * * * *